United States Patent [19]

Page et al.

[11] Patent Number: 5,465,944
[45] Date of Patent: Nov. 14, 1995

[54] BUFFER

[75] Inventors: Ronald C. Page, Coventry; John J. Bushnell, Southam; Raymond B. Stephens, Alcester, all of United Kingdom

[73] Assignee: Oleo International Holdings Limited, Coventry, United Kingdom

[21] Appl. No.: 244,391

[22] PCT Filed: Dec. 14, 1992

[86] PCT No.: PCT/GB92/02314

§ 371 Date: Jun. 13, 1994

§ 102(e) Date: Jun. 13, 1994

[87] PCT Pub. No.: WO93/12361

PCT Pub. Date: Jun. 24, 1993

[30] Foreign Application Priority Data

Dec. 13, 1991 [GB] United Kingdom ............... 9126506
May 27, 1992 [GB] United Kingdom ............... 9211231

[51] Int. Cl.$^6$ .......................................... B60G 13/00
[52] U.S. Cl. ............................... 267/217; 267/64.23
[58] Field of Search ............................. 188/298, 269; 280/708–710; 267/64, 19, 64, 23, 195, 204, 217

[56] References Cited

U.S. PATENT DOCUMENTS

| 3,627,348 | 12/1971 | Klees ................................. 280/709 |
| 3,947,003 | 3/1976 | Jacobellis et al. .................. 267/64 R |
| 3,951,392 | 4/1976 | de la Faille ......................... 267/64 R |
| 4,153,145 | 5/1979 | Ellis et al. .......................... 188/274 |
| 4,284,177 | 8/1981 | Domeuk .............................. 267/217 |
| 4,974,794 | 12/1990 | Aubry ................................ 267/217 |

FOREIGN PATENT DOCUMENTS

| 2236117 | 1/1975 | France . |
| 1129023 | 5/1962 | Germany . |
| 7529322 | 2/1976 | Germany . |
| 226632 | 8/1985 | Germany . |
| 6446031 | 2/1989 | Japan . |
| 864703 | 4/1961 | United Kingdom . |
| 1396421 | 6/1975 | United Kingdom . |

Primary Examiner—Robert J. Oberleitner
Assistant Examiner—Clifford T. Bartz

[57] ABSTRACT

A buffer comprising a plunger slidable in a ported tube. A metal tubular member circumferentially surrounds that part of the ported tube in which all the flow resisting ports are formed and is the radially inner wall of an annular space filled with compressed gas. The outer wall of an annular space is formed by a tubular membrane. The annular chamber between the ported tube and the metal tubular member is part of a low pressure reservoir of the buffer and communicates via an annular passage in the closed end of the buffer with the remainder of the reservoir which is an annular chamber formed between the tubular membrane and the outer tubular wall of the buffer. The metal tubular member shields the tubular membrane from the damaging effects of jets of liquid forced through the flow resisting ports during compression of the buffer. Heat generated by forcing the liquid through the flow resisting ports is carried by liquid flow from the radially inner annular chamber to the radially outer annular chamber via the annular passage and is dissipated from the radially outer annular chamber through the external tubular wall of the buffer.

10 Claims, 3 Drawing Sheets

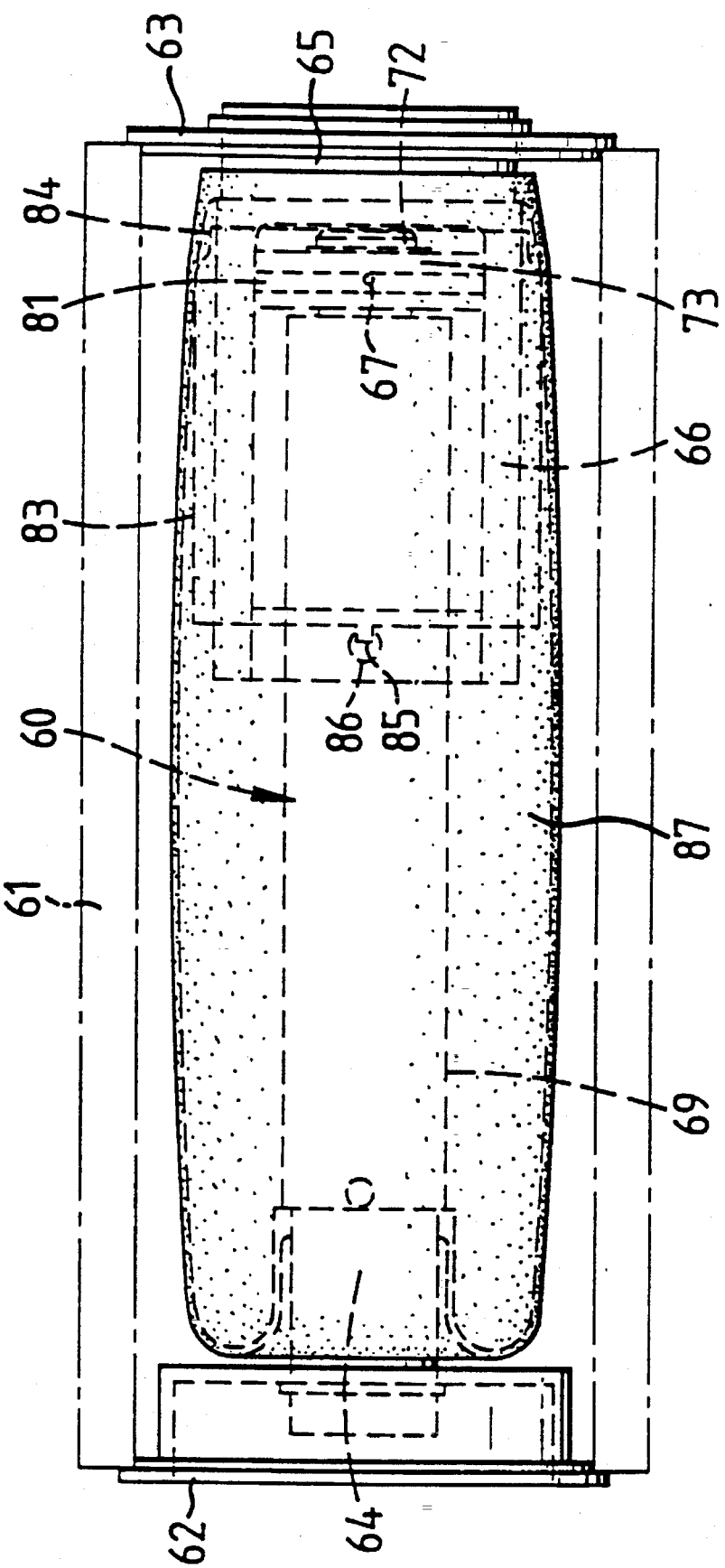

BUFFER

BACKGROUND OF THE INVENTION

This invention relates to a buffer comprising a plunger and cylinder unit, the plunger being forced into the cylinder when a load is applied to the buffer whereby liquid is displaced from a compression chamber within the cylinder into a relatively low pressure reservoir through flow resisting means which provide dynamic resistance.

In practice, such a buffer, which is referred to in this description as a buffer of the kind referred to, includes resilient means such as a spring arrangement or an enclosed body of compressed gas which provides a recoil force opposing inward movement of the plunger with respect to the cylinder by acting to urge liquid in the reservoir into the compression chamber through said flow resisting means.

GB-A-1396421 discloses a shock absorber for a motor vehicle. The shock absorber serves to absorb and dissipate the energy from single or limited numbers of successive shocks such as are exerted on vehicles in the event of impact at low speeds so that, up to a predetermined velocity, damage to the chassis of the vehicle does not occur. The disclosed shock absorber comprises a plunger and cylinder unit, the plunger being carried within one tube by a closed end of that one tube and the cylinder comprising a ported tube which is telescopically slidable within the one tube and which is closed at its end further from the closed end of the one tube, the plunger being forced into the ported tube when a load is applied to the shock absorber whereby liquid is displaced from a compression chamber within the cylinder into a relatively low pressure reservoir through flow resisting means which provide dynamic resistance, wherein the flow resisting means are formed by the ports of the ported tube and the reservoir is formed around the tubes by a radially deformable membrane or resilient bellows which is connected between the two tubes.

According to GB-A-1396421, since upon a compression stroke the streams of damping liquid forced through the throttling ports of the ported tube into the resilient bellows travel at high velocity and consequently impinge with high energy against the internal wall of the resilient bellows, this could with frequent use of the shock absorber cause damage to the bellows and finally cause it to be so badly damaged that it would become unserviceable. With increasing length of stroke even more throttling ports are blanked off, and the energy of the liquid streams passing through the throttling ports which are the last to be blanked off becomes so high that the resilient bellows should desirably be protected in this region. A flange ring encircling and radially spaced from the ported tube and overlapping the ports adjacent to the outer end of the tube, which are the last ports to be blanked off, and around which the adjacent end portion of the resilient bellows is fixedly mounted so that it remains in lining contact with it throughout extension and compression of the shock absorber, serves to protect that end portion of the bellows.

The disclosed shock absorber is a different kind of energy absorber from a buffer designed for industrial use or for use as a railway side buffer, such buffers needing to be suitable for more frequent and perhaps even continuous use and needing to be able to cope with much higher energy impacts.

It is not necessarily from the damaging effects of high energy streams of liquid emerging from the last ports to be blanked off that the bellows needs to be protected. There could be a need for protection from the damaging effects of the streams of liquid that are the first to be blanked off in the event of a high energy impact. Thus it is desirable to provide protection from the damaging effects of the liquid streams that emerge from any or all of the ports of the ported tube.

If the flange ring that provides protection for the adjacent end portion of the bellows were to be extended axially so as to overlap all the ports of the ported tube, the bellows would be liable to be damaged by contact with it before completion of the compression stroke. Also, liquid would be trapped in the inflated toriodal portion of the bellows which would be closed by the flange ring so that the bellows would not function as was intended. Furthermore, arranging for the portion of the bellows that is to be protected to be mounted on the projecting flange ring which it lines means that portion of the bellows material is not available to be inflated for the bellows function and that there is a need to provide a liquid tight seal between the bellows material and the flange as well as between the flange and the ported tube.

We are aware of East German Patent 226632 which discloses a buffer of the kind referred to, wherein the reservoir comprises an annular chamber formed around the plunger by an annular radially deformable membrane which has one of its ends connected to the plunger and its other end connected to the cylinder. The flow restricting means comprise a metering needle which is mounted in a closed end wall of the cylinder and which projects axially towards the plunger, and a metering orifice formed in a blind axial bore formed in the plunger into which a profiled portion of the metering needle projects. Radial passages formed in the plunger provide communication between the axial bore and the annular reservoir chamber formed around the plunger. The resilient means comprise a Ringfeder spring arrangement which surrounds the piston and cylinder unit.

SUMMARY OF THE INVENTION

An object of this invention is to provide protection for a flexible membrane from the damaging effects of streams of liquid that emerge from any of the throttling ports of the ported tube during the compression stroke without interfering with the movement of the membrane and without incurring the various other disadvantages discussed above.

According to this invention there is provided a buffer of the kind referred to, wherein the flow resisting means comprise ports of a ported tube, which also comprises the cylinder, part of the boundary of the reservoir is formed by an annular radially deformable membrane, there being within the membrane an annular member of substantially rigid liquid impermeable material circumferentially surrounding a part of the cylinder in which the last ports to be blanked off during a compression stroke are formed, whereby to protect the membrane from damage by streams of liquid which emerge from said last ports during a compression stroke, and wherein said annular member is of such axial extent as to circumferentially surround that part of the cylinder in which all said ports are formed and said annular membrane envelopes said annular member and is deformable radially relative to said annular member so that an annular space of variable volume is formed between the membrane and the annular member and the annular member is positioned between said annular space and said ported tube.

Preferably resilient means additional to any resilience in the material of the annular membrane are provided to provide a recoil force which opposes inward movement of the plunger into the cylinder.

In one embodiment, the resilient means comprise an enclosed body of compressed gas which is separated from the liquid in the reservoir by the deformable membrane and which provides the recoil force by acting through the deformable membrane to urge liquid in the reservoir into the compression chamber through said ports. Preferably the body of compressed gas is enclosed within the reservoir, conveniently within an annular enclosure in which case passage means contained within structure of the buffer provide communication between an annular part of the reservoir, which is formed between the outside of the ported tube and said annular enclosure and another part of the reservoir which is formed between said annular enclosure and an outer casing of the buffer. Preferably the annular enclosure is formed between said annular member of rigid, impermeable material and said annular, radially deformable membrane.

In another embodiment the reservoir comprises an annular chamber formed around the plunger and the cylinder, said annular, radially deformable membrane being connected to the plunger and to the cylinder, the latter connection being at a location which is further from the plunger than are all the ports. Conveniently the membrane forms the radially outer wall of the reservoir. Preferably the membrane is connected to the plunger in the manner of a rolling diaphragm so that it forms an annular concave portion of the reservoir around the plunger and such that its portion adjacent to its connection to the plunger rolls along the plunger as the plunger moves in either direction.

BRIEF DESCRIPTION OF DRAWINGS

Two embodiments of this invention are described now by way of example with reference to the accompanying drawings, of which:

FIG. 3 is a side elevation of the buffer capsule shown in FIG. 2 in its compressed state.

DETAILED DESCRIPTION OF PREFERRED EMBODIMENTS

Figure 1:
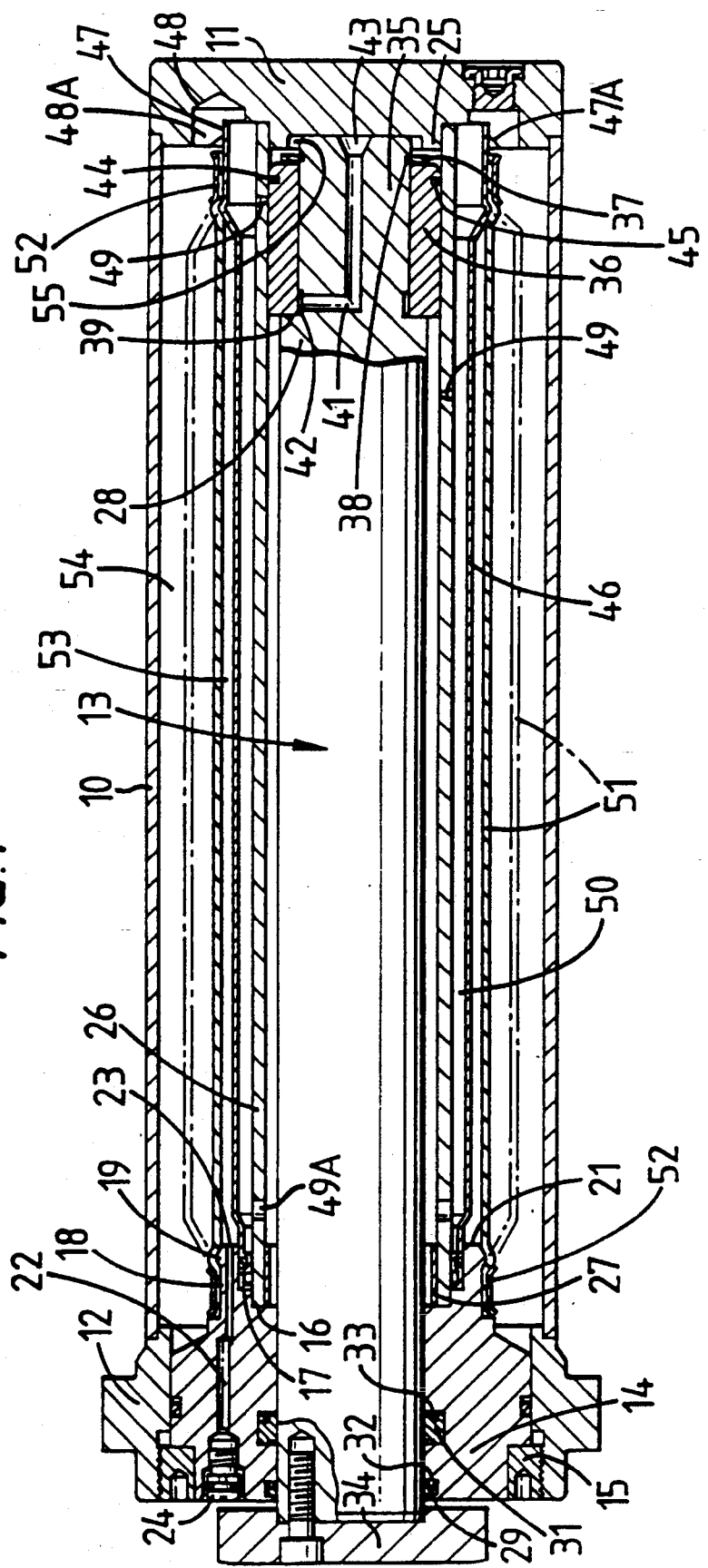
FIG. 1 is a longitudinal section of one form of buffer in which this invention is embodied which is designed for continuous use in an industrial environment, the section being in a transverse plane through the longitudinal axis of the buffer, the buffer being shown in full lines in its contracted condition, the form of the radially deformable membrane when the buffer is extended being shown in chain-dotted lines.

FIG. 1 shows the buffer comprises a plunger and cylinder unit. The major part of the external surface of the buffer is formed by a tube 10 which is closed at one end by an end plate 11 and which has a radially outer end ring 12 fitted to its other end which is the end of the buffer through which the plunger 13 extends. A radially inner end ring 14 is spigotted into the outer end ring 12 and is fixed therein by a locking ring 15 which is screwed into the outer end ring 12 and into which the axially outer end of the inner end ring 14 is spigotted. The bore of the inner radially end ring 14 is doubly-rebated at its axially inner end to form two shoulders 16 and 17. The larger diameter shoulder 17 is surrounded by a cylindrical wall 18 which has a circumferential protruberance 19 formed in its radially outer surface adjacent its brim 21. A conduit 22 extends through the inner ring 14 to a mouth 23 in the brim 21, there being an inflation valve 24 screwed into the end of the conduit 22 at the outer end of the ring 14.

The end plate 11 has a central cylindrical boss 25. The outside diameter of the boss 25 is greater than the inside diameter of the inner end ring 14. The boss 25 is spigotted into one end of a ported tube 26 which is spigotted at its other end into the rebate that forms the inner one 16 of the two shoulders 16 and 17. A tubular spacer 27 is spigotted into the ported tube 26 at its end which, in turn, is spigotted into the inner end ring 14. The ported tube 26 has a number of ports 49 of flow restricting dimensions at varying axially-spaced locations, and a larger diameter hole 49A which allows relatively unrestricted return flow into the tube 26.

The major part 28 of the plunger 13 slides within the inner end ring 14 from which it projects. Sealing rings 29 and 31 each mounted in a respective one of two annular grooves 32 and 33 in the radially inner wall of the inner end ring 14 provide dynamic sealing to oppose escape of liquid from within the cylinder between the major plunger part 28 and the inner end ring 14 and to minimise the amount of liquid that is transferred out of the cylinder as a film on the surface of the major plunger part 28. A buffer plate 34 is mounted on the outer end of the plunger 13.

An inner end portion 35 of the plunger 13 has a smaller outside diameter than the major plunger part 28. It is spigotted into an annular piston head 36 which is a sliding fit within the ported tube 26. A circlip 37, which is retained in an annular groove 38 formed in the radially outer surface of the smaller dieter plunger part 35, is spaced from a step 39 between the smaller diameter axially inner end portion 35 of the plunger 13 and the major plunger part 28 by a distance which is a little greater than the axial length of the annular piston head 36. The arrangement is such that limited axial movement of the annular piston head 36 relative to the inner end portion 35 of the plunger 13 is possible whereas the inner end portion 35 locates the annular piston head 36 against relative radial movement. A partially radial and partially axial passage 41 provides communication between an annular recess 42 which is formed in the radially outer surface of the inner end portion 35 of the plunger 13 adjacent the step 39, and an orifice 43 which is formed at the centre of the axially inner end of the inner end portion 35 of the plunger 13. -A piston ring seal 44, which is carried by the annular piston head 36 in an annular groove 45 formed in its radially outer surface engages the radially inner surface of the ported tube 26.

A tubular member 46 formed of a relatively thin metal has one end spigotted into the bore of the cylindrical wall 18 and a larger diameter end which is spigotted into an annular groove 47 which is formed in the axially inner face of the end plate 11 around the cylindrical boss 25. The radially outer wall of the annular groove 47 has an outwardly s loping frusto-conical portion 47A leading to its brim. Two or more holes 48 are drilled at circumferentially spaced locations in the axially inner face of the inner end plate 11 with their centres on a pitch circle having a diameter greater than the outside diameter of the annular groove 47. The diameter of each hole 48 is sufficient for part of that hole 48 to be in the base of the annular groove 47. That part of each hole 48 which is disposed radially outwardly with respect to the annular groove 47 is a projection of a respective arcuate recess 48A in the radially outer wall of the annular groove 47. The holes 48 and the recesses 48A allow free communication between the interior of the tubular member 46 and the area surrounding that tubular member 46, around the larger diameter end of that tubular member 46.

The tubular member 46 surrounds the ported tube 26 from which it is spaced so as to form an annular chamber 50 with which each port 49 of the ported tube 26 communicates and which thereby forms part of the low pressure reservoir of the buffer. The major part of the tubular member 46 has a diameter which is greater than the diameter of the smaller end part that is spigotted into the cylindrical wall 18 but which is smaller than the diameter of the larger diameter end part that is spigotted into the annular groove 47 in the end plate 11.

A tubular membrane 51 of radially deformable gas impermeable material, such as an elastomeric material, is clamped at one end around the larger diameter end portion of the tubular member 46 and at its other end around the outer surface o f the cylindrical wall 18. It is so clamped at either end by a respective clamping ring 52. The tubular metal member 46 and the annular membrane 51, together with the brim 21 of the cylindrical wall 18, enclose an annular space 53 with which the conduit 22 communicates. This space 53 is filled with compressed gas introduced by the inflation valve 24 through the conduit 22. Another annular chamber 54 is bounded primarily by the interior of the tube 10 and the exterior of the tubular membrane 51, and extends between the end plate 11 and the end rings 12 and 14. That annular chamber 54, being in communication via the arcuate recesses 48A and the holes 48 with the annular chamber 50 between the ported tube 26 and the tubular member 46, forms the remainder o f the reservoir space and thereby is a part of the reservoir which is bounded by structure, namely the tube 10, which forms an external surface of the buffer.

When the buffer is charged for use, the reservoir comprising the annular chambers 50 and 54 is filled with liquid as is the cylinder space within the ported tube 26, the buffer plunger 13 being at the end of its travel that is furthest from the end wall 11 and in which the annular piston head 36 is adjacent to the sleeve bearing 27. The part 55 of the cylinder space between the buffer plunger 13 and the end wall 11 is known as the compression chamber.

As the system is substantially unloaded, the radially deformable membrane 51 is extended radially by the action of the compressed gas within it and it adopts the position which is shown in chain-dotted lines in FIG. 1.

A load is applied to the buffer in the form of an impact on the buffer plate 34. As a result the buffer plunger 13 is forced into the cylinder. Such movement of the plunger 13 into the cylinder displaces liquid from the compression chamber 55 through the ports 49 into the reservoir. Such displacement of liquid is resisted by the ports 49 due to their flow restricting dimensions. Hence the ports 49 provide dynamic resistance to inward movement of the plunger 13. It will be understood that the number of ports 49 that communicate with the compression chamber 55 at any one instant reduces as the plunger 13 moves into the cylinder so that the dynamic resistance is increased. Liquid forced through the ports 49 first enters the annular chamber 50 formed between the ported tube 26 and the tubular member 46 around it. That liquid is forced from that annular chamber 50 into the annular chamber 54 through the holes 48 and the arcuate recesses 48A and is thereby directed to a part of the reservoir from which heat dissipation from the liquid to the surrounding atmosphere is possible through the structure of the buffer. Forcing liquid into the annular chamber 54 causes radial contraction of the tubular membrane 51 thereby increasing the pressure of the gas enclosed within the annular space 53. It will be understood that the compressed gas within the annular space 53 tends to oppose entry of additional liquid into the annular chamber 54 and thus tends to oppose displacement of liquid from the compression chamber 55. Also the compressed gas in the annular space 53 provides a recoil force since it will expand, causing the tubular membrane 51 to expand radially, and thereby displace liquid from the annular chamber 54 through the arcuate recesses 48A and the holes 48 into the annular chamber 50 between the tubular member 46 and the ported tube 26 and back through the return hole 49A into the interior of the ported tube 26 when the load is removed from the buffer plunger 13. Liquid that re-enters the interior of the ported tube 26 between the spacer 27 and the annular piston head 36 initially will urge the piston head 36 against the circlip 37, thereby uncovering an opening formed by the annular recess 42 and thus obtaining passage the compression chamber 55 and causing movement of the plunger 13 out of the cylinder, to uncover ports 49 and allow further flow of liquid into the compression chamber 55.

Figure 2:
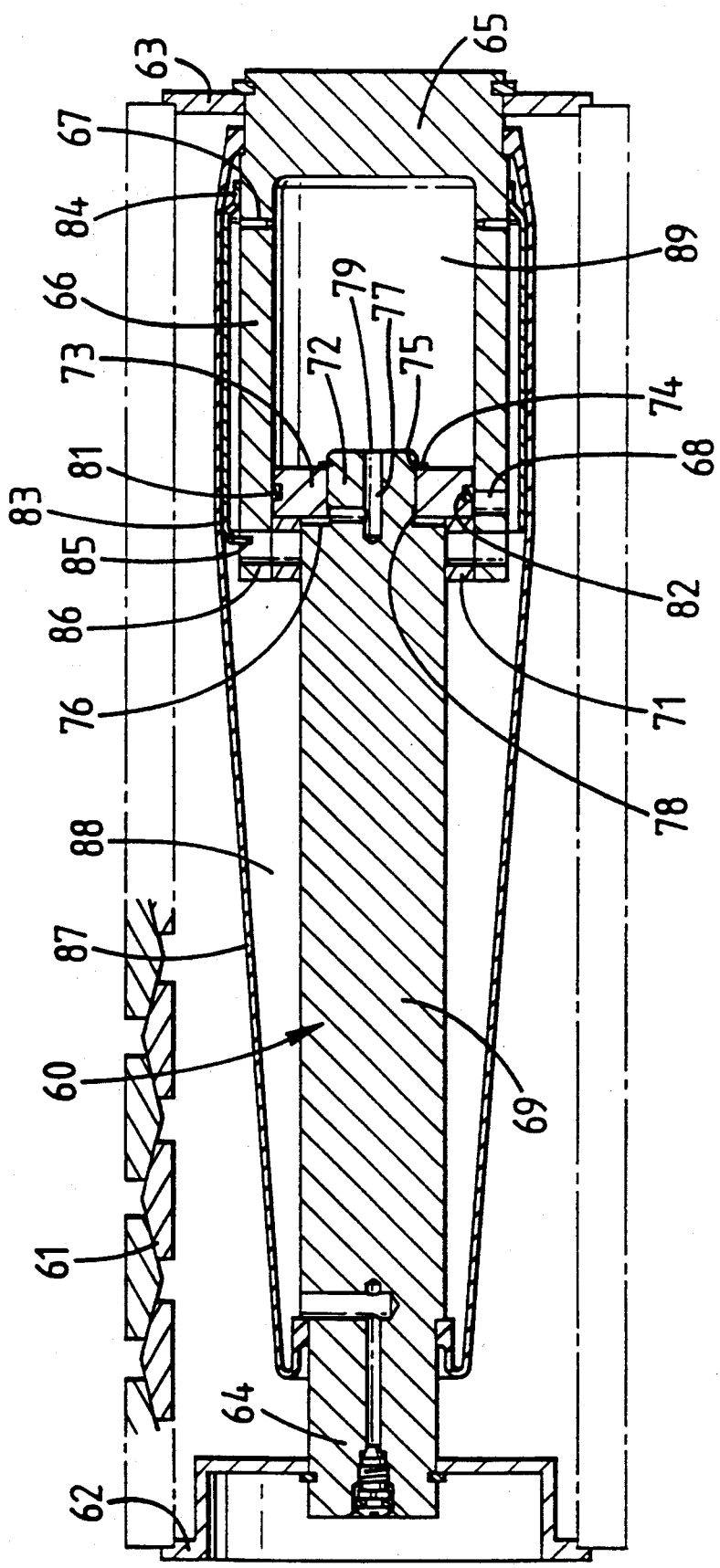
FIG. 2 is a longitudinal section of a railway side buffer capsule in which this invention is embodied, the section being taken in a transverse plane through the longitudinal axis of the buffer capsule which is shown extended.

FIGS. 2 and 3 show the capsule of a railway side buffer which comprises a plunger and cylinder unit 60 which is urged into its extended condition by a Ringfeder spring 61 which co-axially surrounds the unit 60 and acts between end plates 62 and 63 mounted respectively on the plunger 64 and the cylinder 65.

The cylinder wall 66 comprises a ported tube having a number of ports 67 of flow restricting dimensions at varying axially spaced locations, and a larger diameter hole 68 adjacent the brim of the cylinder 65 which allows relatively unrestricted flow through it.

The major part 69 of the plunger 64 slides within a ring 71 from which it projects, the ring 71 being mounted in the brim of the cylinder 65.

An inner end portion 72 of the plunger 64 has a smaller outside diameter than the major plunger part 69. It is spigoted into an annular piston head 73 which is a sliding fit within the ported cylinder wall 66. A circlip 74, which is retained in an annular groove 75 formed in the radially outer surface of the smaller diameter plunger part 72, is spaced from a step 76 between the smaller diameter axially inner end portion 72 of the plunger 64 and the major plunger part 69 by a distance which is a little greater than the axial thickness of the annular piston head 73. The arrangement is such that limited axial movement of the annular piston head 73 relative to the inner end portion 72 of the plunger 64 is possible whereas the inner end portion 72 locates the annular piston head 73 against relative radial movement. A partially radial and partially axial passage 77 provides communication between an annular recess 78 which is formed in the radially outer surface of the inner end portion 72 of the plunger 64 adjacent the step 76, and an orifice 79 which is formed at the centre of the axially inner end of the inner end portion 72 of the plunger 64, when the annular piston head 73 is held against the circlip 74 and thus is spaced from the step 76. A piston ring seal 81, which is carried by the annular piston head 73, in an annular groove 82 formed in its radially outer surface engages the radially inner surface of the ported cylinder wall 66.

A tubular member 83 formed of a relatively thin metal has a reduced diameter neck portion 84 at one end and a radially inwardly projecting tab 85 at the other end. The major part of the tubular member 83 between the neck portion 84 and the tab 85 has a diameter which is larger than the outside diameter of the ported cylinder wall 66. The tubular member 83 is fitted onto the cylinder 65 by engagement of its neck portion 84 with the external surface of the cylinder 65 at a location which is between the end plate 63 and the ports 67. The tab 85 projects into a radial passage 86 which is formed through the cylinder wall 66 adjacent to its brim and through the ring 71. Hence the tubular member 83 encloses an annular space around the radially outer ends of all the ports 67.

A tubular membrane 87 of radially deformable liquid impermeable material, such as an elastomeric material, is fitted at one end around the cylinder 65 at a location between the neck portion 84 of the tubular member 83 and the end plate 63, and at its other end around the major plunger portion 69 adjacent to the end plate 62. The membrane 87 is secured to the cylinder 66 and the plunger 64 in a liquid-tight manner and it encloses an annular space 88 around the plunger 64 and cylinder 65 as well as enveloping the tubular member 83. It is connected to the plunger 69 in the manner of a rolling diaphragm so that it forms an annular concave portion of the annular space 88 around the plunger 69. It would be appreciated that the annular space defined between the tubular member 83 and the external wall of the cylinder 66 communicates with the annular space 88 enclosed within the annular membrane 87 around the plunger 64 and cylinder 65.

When the buffer is charged for use, the reservoir comprising the annular space surrounding the plunger and cylinder within the membrane 87 is filled with liquid as is the cylinder space, the buffer plunger 64 being at the end of its travel which is furthest from the closed end wall of the cylinder 65 and in which the annular piston head 73 is adjacent to the ring 71 as is shown in FIG. 2. The pan 89 of the cylinder space between the buffer plunger 64 and the closed end wall of the cylinder 65 is known as the compression chamber.

A load is applied to the buffer in the form of an impact on a buffer plate which is fitted onto the end of the buffer plunger 64 and the adjacent end of the spring 61. As a result the buffer plunger 64 is forced into the cylinder 65, the annular piston head 73 being held against the step 76 so that the passage 77 is closed. Such movement of the plunger 64 into the cylinder 65 displaces liquid from the compression chamber 89 through the pens 67 into the reservoir. Such displacement of liquid is resisted by the ports 67 due to their flow restricting dimensions. Hence the ports 67 provide dynamic resistance to inward movement of the plunger 64. It will be understood that the number o f pens 67 that communicate with the compression chamber 89 at any one instant reduces as the plunger 64 moves into the cylinder 65 so that the dynamic resistance is increased. Liquid forced through the ports 67 first enters the annular space formed around the cylinder 65 by the tubular member 83. That liquid is forced from that annular space into the annular space 88 within the annular membrane 87. That causes radial expansion of the tubular membrane 87. The annular membrane 87 is radially displaceable relative to the tubular member 83 so that a part of the annular space 88 of variable volume is formed between the expanded membrane 87 and the tubular member 83 as can be seen from FIG. 3. Hence the tubular member 83 is disposed between the ported tubular cylinder wall 66 and that variable volume part of the reservoir formed between it and the membrane 87.

At the same time the spring 61 will be compressed, such compression of the spring 61 tending to oppose contraction of the buffer and thus further displacement of the liquid from within the compression chamber 89 through the ports 67.

Energy is absorbed by the action of forcing liquid through the ports 67. Compression of the spring 61 and, to a certain extent, expansion of the annular membrane 87, together provide a recoil force so that, when the load is removed, the plunger 64 is urged to carry the piston head 73 toward the ring 71 and liquid within the annular space 88 is forced back through the ports 67 into the compression chamber 89. Liquid in the annular space between the annular piston head 73 and the ring 71 being allowed to enter the compression chamber 89 through the passage 77 since the annular piston head 73 will be displaced from the step 76 thus uncovering part of the annular recess 78.

It will be appreciated from FIGS. 2 and 3 that the portion of the annular membrane 87 that forms the annular concave portion of the annular space 88 around the plunger 69, rolls along the plunger 69 as the plunger 69 moves in either direction, rolling onto the plunger 69 during the compression stroke and peeling off the plunger during the expansion stroke. That minimises the loading on the portion of the annular membrane 87 that is connected to the plunger 69.

It will be appreciated that the tubular member 83 protects the membrane 87 from being damaged by the high pressure Jets of liquid that are formed by the liquid that is displaced from the compression chamber 89 through the ports 67 by movement of the plunger 14 into the cylinder 65 when a load is applied to the buffer.

Consideration should be given to the possibility that pressures which are sufficiently high to deform the material of the cylinder 65 may be generated in that cylinder 65. It may be that such deformation would not exceed the elastic limit of that material so that it could be tolerated. Otherwise a conventional pressure relief valve should be provided, for example a normally closed valve comprising an obturating member normally seated to close a passage through the piston head 36 by the action of resilient means such as a stack of Belleville washers which would yield to allow the valve to unseat when subjected to excessive pressures within the compression chamber.

We claim:

1. A buffer comprising:

a plunger and cylinder unit, the plunger being forced into the cylinder when a load is applied to the buffer to thereby displace liquid from a compression chamber within the cylinder into a relatively low pressure reservoir flow resisting means which provide dynamic resistance to movement of the plunger;

said flow resisting means being ports of flow restricting dimensions at axially spaced location along the length of a ported tube, which also comprises the cylinder;

wherein a part of the boundary of the reservoir is formed by a tubular membrane of radially deformable material, said tubular membrane being fixedly mounted at each end thereof to the cylinder, there being within the membrane a tubular member of substantially rigid, liquid-impermeable material which circumferentially surrounds said ported tube and axially extends to cover all said ports thereof to thereby protect the membrane from damage by streams of liquid which emerge from said ports during a compression stroke;

said membrane being deformable radially relative to said tubular member to thereby form an annular space of variable volume between the membrane and said tubular member.

2. The buffer according to claim 1, and further comprising resilient means, additional to any resilience in the material of the membrane for providing a recoil force which opposes inward movement of the plunger into the cylinder.

3. A buffer comprising:

a plunger and cylinder unit, the plunger being forced into the cylinder when a load is applied to the buffer to thereby displace liquid from a compression chamber within the cylinder into a relatively low pressure reservoir through flow resisting means which provide dynamic resistance to movement to the plunger;

said flow resisting means being ports of flow restricting dimensions at axially spaced locations along the length of a ported tube, which also comprises the cylinder;

wherein a part of the boundary of the reservoir is formed by a membrane of radially deformable material, there being within the membrane a tubular member of substantially rigid, liquid-impermeable material which circumferentially surrounds said ported tube and axially extends to cover all said ports thereof to thereby protect the membrane from damage by streams of liquid which emerge from said ports during a compression stroke;

said membrane being deformable radially relative to said tubular member to thereby form an annular space of variable volume between the membrane and said tubular member; and resilient means, additional to any resilience in the material of the membrane for providing a recoil force which opposes inward movement of the plunger into the cylinder;

wherein the resilient means comprises an enclosed body of compressed gas which is separated from the liquid in the reservoir by the membrane and which provides the recoil force by acting through the membrane to urge liquid in the reservoir into the compression chamber.

4. The buffer according to claim 3, wherein said enclosed body of compressed gas is enclosed within said reservoir.

5. A buffer comprising:

a plunger and cylinder unit, the plunger being forced into the cylinder unit when a load is applied to the buffer whereby liquid is displaced from a compression chamber within the cylinder unit into a relatively low pressure reservoir through flow resisting means which provide dynamic resistance to movement of the plunger;

said flow resisting means comprising ports of a ported tube, which tube also comprises the cylinder;

wherein a part of the boundry of the reservoir is formed by a radially deformable membrane, there being within the radially deformable membrane a tubular member of substantially rigid, liquid-impermeable material which circumferentially surrounds a part of the cylinder in which said ports are formed so as to protect the radially deformable membrane from damage by streams of liquid which emerge from said ports during a compression stroke;

wherein said tubular member is positioned between said ported tube and said radially deformable membrane and is of such axial extent as to circumferentially surround all said ports of the ported tube;

resilient means, additional to any resilience in the material of the radially deformable membrane, which provide a recoil force which opposes inward movement of the plunger into the cylinder;

wherein the resilient means comprises an enclosed body of compressed gas which is separated from the liquid in the reservoir by the radially deformable membrane and which provides the recoil force by acting through the radially deformable membrane to urge liquid in the reservoir into the compression chamber;

wherein said enclosed body of compressed gas is enclosed within an annular space, and wherein there is provided passage means, contained within structure of the buffer, for communication between an annular part of the reservoir, which is formed between the outside of the ported tube and said tubular member and another part of the reservoir which is formed between said radially deformable membrane and a tube which forms an outer casing of the buffer.

6. The buffer according to claim 5, wherein said annular space is formed by said tubular member of rigid, liquid-impermeable material and said radially deformable membrane.

7. A buffer comprising a plunger and cylinder unit, the cylinder comprising a ported tube, the ports of which are formed at axially spaced locations along the tube, the plunger being forced into the cylinder when a load is applied to the buffer whereby liquid is displaced through said ports which collectively comprise flow resisting means which provide dynamic resistance, from a compression chamber within the cylinder into a relatively low pressure reservoir which comprises an annular chamber which circumferentially surrounds the tube, the number of ports in direct communication with said pressure chamber reducing as the plunger moves into the cylinder, there being a body of compressed gas enclosed within an annular enclosure which also surrounds the ported tube and which comprises an annular radially deformable membrane arranged to provide a recoil force opposing inward movement of the plunger with respect to the cylinder by acting to urge liquid in the reservoir into the compression chamber through said flow resisting means, wherein a part of the reservoir is bounded by structure which forms an external surface of the buffer which is arranged so that liquid displaced from the compression chamber through the flow resisting means is directed to said part of the reservoir so that heat can be dissipated from that liquid through said structure which forms an external surface of the buffer, characterised in that said annular enclosure is spaced from said structure which forms an external surface of the buffer and is within said reservoir, being between said part which is bounded by said structure which forms an external surface of the buffer and another part which is formed between it and the outside of the ported tube, and passage means wholly contained within the structure of said buffer provide communication between said part of the reservoir which is bounded by said structure which forms an external surface of the buffer and the other part between the ported tube and said annular enclosure.

8. A buffer according to claim 7, wherein the enclosure comprises a tubular member of substantially rigid gas impervious material and said radially deformable membrane, the tubular member being between the ported tube and the radially deformable membrane and the gas being enclosed within a space between the tubular member and the radially deformable membrane.

9. A buffer according to claim 7, wherein the plunger has a piston head which slides within the bore of the ported tube and which is formed by a ring which is mounted on an axially inner end portion of the plunger for limited axial displacement relative to the remainder of the plunger, there being passage means through said inner end portion of the plunger extending between an orifice at the inner end of the plunger and an opening which is closed by the ring when the latter is at the end of its limited axial displacement further from said inner end of the plunger and which is opened by displacement of the ring relative to the remainder of the plunger towards said inner end of the plunger, the diameter of the remainder of the plunger between said ring and the outer end of the plunger being less than the inside diameter of the ported tube so that an annular space is formed therebetween.

10. A buffer according to claim 8, wherein the plunger has a piston head which slides within the bore of the ported tube and which is formed by a ring which is mounted on an axially inner end portion of the plunger for limited axial displacement relative to the remainder of the plunger, there being passage means through said inner end portion of the plunger extending between an orifice at the inner end of the plunger and an opening which is closed by the ring when the latter is at the end of its limited axial displacement further from said inner end of the plunger and which is opened by displacement of the ring relative to the remainder of the plunger towards said inner end of the plunger, the diameter of the remainder of the plunger between said ring and the outer end of the plunger being less than the inside diameter of the ported tube so that an annular space is formed therebetween.

* * * * *